United States Patent
Bonilla et al.

(10) Patent No.: US 6,795,855 B2
(45) Date of Patent: Sep. 21, 2004

(54) NON-ROOT USERS EXECUTION OF ROOT COMMANDS

(75) Inventors: Carlos A. Bonilla, Fort Collins, CO (US); Douglas P. Drees, Fort Collins, CO (US); Mary Thomas Robb, Fort Collins, CO (US); Jeffrey R. Finz, Portland, OR (US); Terence E. Lister, Fort Collins, CO (US); Humberto A. Sanchez, II, Fort Collins, CO (US); Paula Curtis, Windsor, CO (US); Richard Dale Harrah, Seattle, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 713 days.

(21) Appl. No.: 09/827,150

(22) Filed: Apr. 5, 2001

(65) Prior Publication Data

US 2002/0174256 A1 Nov. 21, 2002

(51) Int. Cl.[7] .............................................. G06F 15/16
(52) U.S. Cl. ...................................... 709/223; 709/224
(58) Field of Search ................................. 709/223, 224; 713/200, 201

(56) References Cited

U.S. PATENT DOCUMENTS

2002/0144137 A1 * 10/2002 Harrah et al. ............... 713/200
2002/0178297 A1 * 11/2002 Lister et al. ................ 709/310

* cited by examiner

Primary Examiner—Krisna Lim

(57) ABSTRACT

A service control manager (SCM) module may, through a light weight centraized authorization process, assign certain tools to a role so that a non-root user with such role may run the authorized commands specified in the tools as a root user. The usage of these commands is tracked and logged, typically by a log manager who observes each of the commands that are run within the role. If the non-root user tries to run a command that is not assigned to the role, the log manager may block that attempt. Therefore the light-weight authorization may be achieved without compromising security. The user may also be given a finer granularity of running specific commands and options. In addition, the non-root user with the role may only need to be authorized on one node (machine) to be able to perform the commands on multiple nodes.

20 Claims, 5 Drawing Sheets

NON-ROOT USERS EXECUTION OF ROOT COMMANDS

TECHNICAL FIELD

The present invention relates to system administration management, and, in particular, to service control manager modules.

BACKGROUND

A system management command, referred to as superuser do (Sudo), may allow a system administrator to give non-root users the ability to run some or all commands as root while logging all commands and arguments. Sudo may restrict what commands the users may run on a per-host basis, while logging each command and providing a clear audit trail of who did what. However, Sudo may not allow the finer granularity of authorizing a command and options. In addition, Sudo only runs on a per-machine basis, so a non-root user who wishes to have root privileges on multiple machines may need to be enabled multiple times on the multiple machines.

Other authorization commands and mechanisms, such as .rhosts and remsh, may allow users on one machine to execute commands on a remote machine. However, these authorization have no restrictions in that the authorized user may have full access to a system and run all of the commands and options on the machines in the system. Such user authorization may cause security problems.

SUMMARY

A service control manager (SCM) module may, through a light weight centralized authorization process, grant limited access to a non-root user to run certain root commands without external authorization involving the trusted user or the senior administrator. The SCM module may utilize an authorization model to assign tools that specify the root commands to a role and assign the role to a non-root user, so that the non-root user may, based upon the roles assigned, run the root commands and options specified in these tools as a root user, i.e., without external authorization. However, the non-root user has only limited access in that he/she is only authorized to run the commands assigned to the specific role. The usage of the commands specified in the tools is tracked and logged, typically by a log manager who observes each of the commands that are run within the role. If the non-root user tries to run a command that is not assigned to the role, the log manager may block that attempt. Therefore, the light weight authorization may be achieved without compromising system security. The user may also be given a finer granularity of running specific commands with specific options. In addition, assigned with the specific role, the non-root user may only need to be authorized on one node (machine) to be able to perform the commands on multiple nodes.

DESCRIPTION OF THE DRAWINGS

The detailed description refers to the following drawings, in which like numbers refer to like elements, and in which.

A service control manager (SCM) module multiplies system administration effectiveness by distributing the effects of existing tools efficiently across managed servers. The phrase "service control manager" is intended as a label only, and different labels can be used to describe modules or other entities having the same or similar functions.

In the SCM domain, the managed servers (systems) are referred to as "managed nodes" or simply as "nodes". SCM node groups are collections of nodes in the SCM module. They may have overlapping memberships, such that a single node may be a member of more than one group. The grouping mechanism may allow flexible partitioning of the SCM module so that users may use it to reflect the way nodes are already grouped in their environment.

Figure 1:
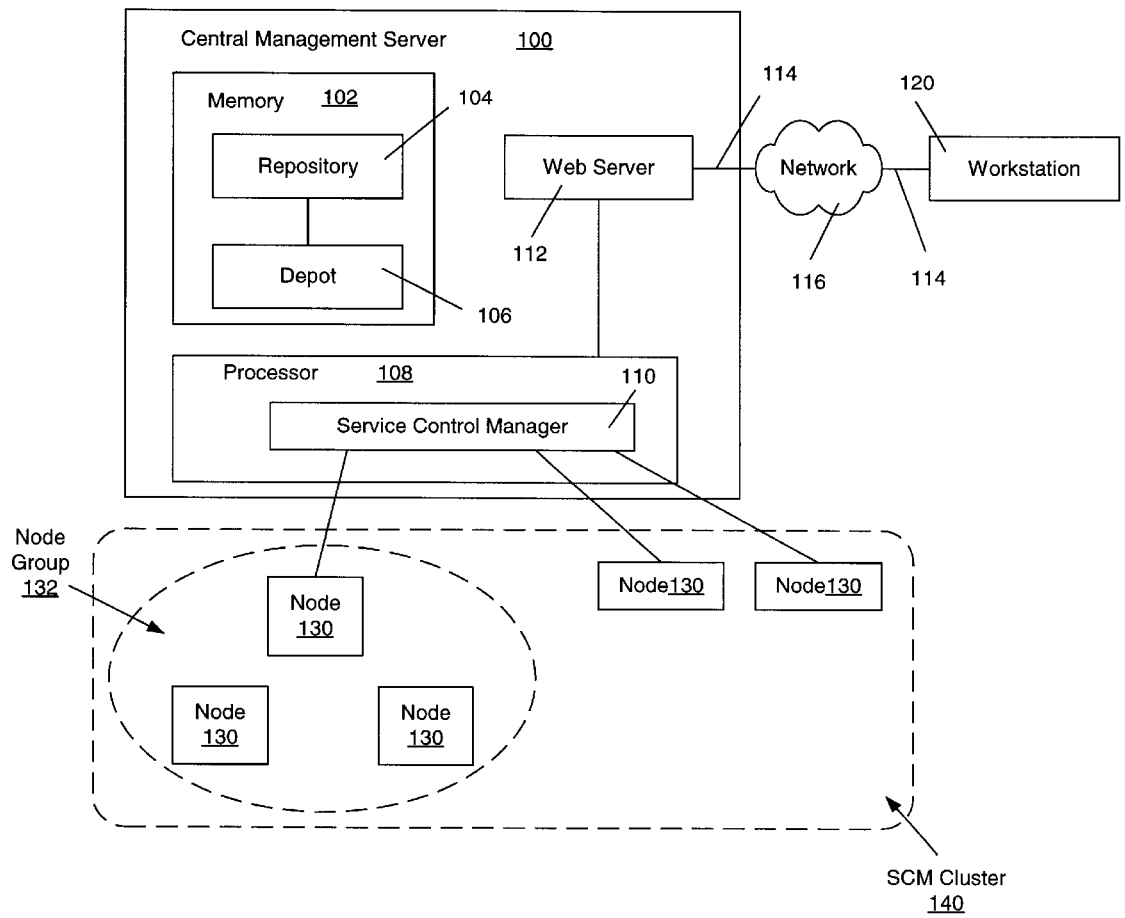
FIG. 1 illustrates a computer network system with which the present invention may be used.

FIG. 1 illustrates a computer network system with which the present invention may be used. The network system includes an SCM 110 running on a Central Management Server (CMS) 100 and one or more nodes 130 or node groups 132 managed by the SCM 110. The one or more nodes 130 and node groups 132 make up an SCM cluster 140. See ServiceControl Manager Technical Reference, HP® part number: B8339-90019, available from Hewlett-Packard Company, Palo Alto, Calif., which is hereby incorporated by reference for a more detailed description of the SCM 110.

The CMS 100 can be implemented with, for example, an HP-UX 11.x server running the SCM 110 software. The CMS 100 includes a memory 102, a secondary storage device (not shown), a processor 108, an input device (not shown), a display device (not shown), and an output device (not shown). The memory 102 may include computer readable media, RAM or similar types of memory, and it may store one or more applications for execution by processor 108, including the SCM 110 software. The secondary storage device may include computer readable media, a hard disk drive, floppy disk drive, CD-ROM drive, or other types of non-volatile data storage. The processor 108 executes the SCM software and other application(s), which are stored in memory or secondary storage, or received from the Internet or other network 116. The input device may include any device for entering data into the CMS 100, such as a keyboard, keypad, cursor-control device, touch-screen (possibly with a stylus), or microphone. The display device may include any type of device for presenting a visual image, such as, for example, a computer monitor, flat-screen display, or display panel. The output device may include any type of device for presenting data in hard copy format, such as a printer, and other types of output devices include speakers or any device for providing data in audio form. The CMS 100 can possibly include multiple input devices, output devices, and display devices.

The CMS 100 itself may be required to be a managed node, so that multi-system aware (MSA) tools may be invoked on the CMS. All other nodes 130 may need to be explicitly added to the SCM cluster 140.

Generally, the SCM 110 supports managing a single SCM cluster 140 from a single CMS 100. All tasks performed on the SCM cluster 140 are initiated on the CMS 100 either directly or remotely, for example, by reaching the CMS 100 via a web connection 114. Therefore, the workstation 120 at which a user sits only needs a web connection 114 over a network 116, such as the Internet or other type of computer network, to the CMS 100 in order to perform tasks on the SCM cluster 140. The CMS 100 preferably also includes a centralized data repository 104 for the SCM cluster 140, a web server 112 that allows web access to the SCM 110 and a depot 106 that includes products used in the configuring of nodes 130. A user interface may only run on the CMS 100, and no other node 130 in the SCM module may execute remote tasks, access the repository 104, or any other SCM operations.

Although the CMS 100 is depicted with various components, one skilled in the art will appreciated that this server can contain additional or different components. In addition, although aspects of an implementation consistent with the present invention are described as being stored in memory, one skilled in the art will appreciated that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the CMS 100 to perform a particular method.

A central part of the SCM module 110 is the ability to execute various management commands or applications on the one or more nodes simultaneously. The commands or applications may need to be encapsulated with an SCM tool, which is typically used to copy files and/or execute commands on the target nodes 130. The SCM tool may run simple commands such as bdf (1) or mount (1M), launch single system interactive applications such as System Administration Manager (SAM) or Glance, launch multi-system aware applications such as Ignite/UX or Software Distributor (SD), or perform other functions. The tool may be defined using an SCM tool definition language through either a command line interface (CLI) or an SCM-provided graphical user interface (GUI).

There are two general types of tools: single-system aware (SSA) tools and multi-system aware (MSA) tools. SSA tools may run on a node 130 and may only affect the operation of that node 130. To run SSA tools on multiple target nodes 130, the SCM module 110 may execute the tools on each target node 130. In addition to executing commands or launching applications, SSA tools may copy files from the CMS 100 to the target nodes 130. Files may only be copied from the CMS 100 to the managed nodes 130 in this exemplary embodiment, not from the nodes 130 back to the CMS 100.

MSA tools may run on a single node 130 but may be able to operate on multiple other nodes 130. MSA tools are applications that execute on a single node but can detect and contact other nodes to accomplish their work and this contact is out of the control of the SCM module 110. This type of application may need to have a list of nodes 130 passed as an argument at runtime. A node 130 where the application will execute may need to be specified at tool creation time, not at runtime. The target nodes 130 selected by the user may be passed to an MSA tool via a target environment variable that contains a target node list for the MSA tools. MSA tools may not copy files to either the manager node 100 or to the target nodes 130 in this exemplary embodiment. Therefore, an execution command string may be required for MSA tools.

An SCM user may be a user that is known to the SCM module 110 and has some privileges and/or management roles. An SCM role, which is an expression of intent and a collection of tools for accomplishing that intent, typically defines what the user is able to do on the associated nodes 130 or node groups 132, e.g., whether a user may run a tool on a node 130. Typically, in order to start the SCM module 110 or execute any SCM tools, the user may need to be added to the SCM module 110 and authorized either via the GUI or the command line interface (CLI). All SCM module 110 operations maybe authorized based on the user's SCM authorization configuration, and/or whether or not the user has been granted SCM trusted user privilege.

The SCM user may, depending upon the roles assigned, manage systems via the SCM module 110. In addition, the user may examine the SCM module log, and scan the group and role configurations. When the SCM user runs a tool, the result maybe an SCM task. The SCM module 110 typically assigns a task identifier for every task after it has been defined and before it is run on any target nodes 130. This identifier may be used to track the task and to look up information later about the task in an SCM central log.

An SCM trusted user is an SCM user responsible for the configuration and general administration of the SCM module 110. The trusted user is typically a manager or a supervisor of a group of administrators whom a company trusts, or other trusted individual. Entrusted with the highest authority, the trusted user may execute any system management task with all of the nodes (machines) managed by the SCM module 110. The capabilities of the trusted user include, for example, one or more of the following: creating or modifying a user's security profile; adding, modifying or deleting a node or node group; tool modification; and tool authorization. The granting of these privileges implies a trust that the user is responsible for configuring and maintaining the overall structure of the SCM module 110.

An SCM authorization model supports the notion of assigning to users the ability to run a set of tools on a set of nodes. An authorization object is an association that links a user to a role on either a node or a node group. Each role may have one or more tools and each tool may belong to one or more roles. When users are given the authority to perform some limited set of functionality on one or more nodes, the authorization is done based upon roles and not on tools. The role allows the sum total of functionality represented by all the tools to be divided into logical sets that correspond to the responsibilities that would be given to the various administrators. Accordingly, there are different roles that may be configured and assigned with authorization. For example, a backup administrator with a "backup" role may contain tools that perform backups, manage scheduled backups, view backup status, and other backup functions. On the other hand, a database administrator with a "database" role may have a different set of tools. When a user attempts to run a tool on a node, the user may need to be checked to determine if the user is authorized to fulfill a certain role on the node and if that role contains the tool. Once a user is assigned a role, the user may be given access to any newly created tools that are later added to the role. In the example given above, the backup administrator may be assigned the "backup" role for a group of systems that run a specific application. When new backup tools are created and added to the "backup" role, the backup administrator may immediately be given access to the new tools on the systems.

Figure 2:
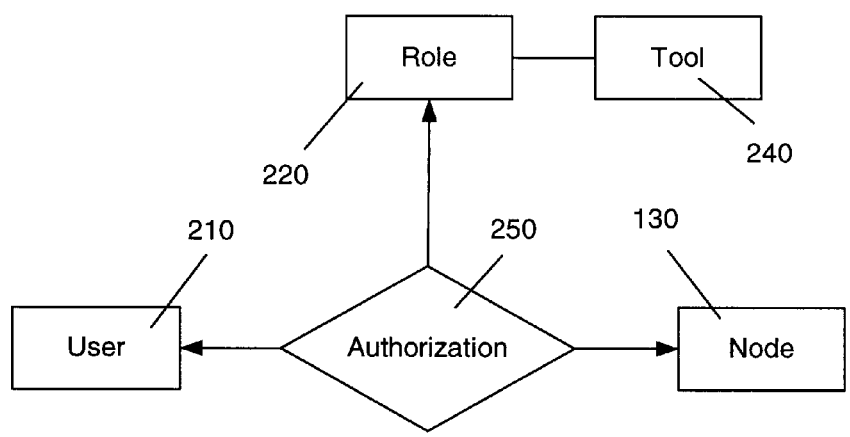
FIG. 2 illustrates the relationships between the user, role, node, tool and authorization objects.

FIG. 2 illustrates the relationships between the user 210, role 220, node 130, tool 240, and authorization 250 objects. User objects 210 represent users 210, role objects 220 represent roles 220, node objects 130 represent nodes 130, tool objects 240 represent tools 240, and authorization objects 250 represent authorizations 250. However, for purposes of this application, these terms are used interchangeably. Each authorization object 250 links a single user object 210 to a single role object 220 and to a single node object 130 (or a node group object 132). Each role object 220 may correspond to one or more tool objects 240, and each tool object 240 may correspond to one or more role objects 220. Each user object 210 may be assigned multiple authorizations 250, as may each role object 220 and each node object 130. For example, Role 1 may contain Tools 1-N, and User 1 may be assigned Roles 1-M by the authorization model on Node 1. Consequently, User 1 may run Tools 1-N on Node 1, based upon the role assigned, Role 1.

Table 1 illustrates an example of a data structure for assigning tools 240 and commands specified in the tools 240 to different roles 220. Table 2 illustrates an example of a data structure for assigning the roles 220 to different users 210.

TABLE 1

| Roles  | Tools      | Commands and Applications |
|--------|------------|---------------------------|
| Role 1 | Tools 1-N  | Commands 1-L              |
| ...    | ...        | ...                       |
| Role n | Tools 1-Nn | Commands 1-Ln             |

TABLE 2

| Users  | Assigned Roles |
|--------|----------------|
| User 1 | Roles 1-M      |
| ...    | ...            |
| User n | Roles 1-Mn     |

Although FIG. 2 shows a node authorization, a similar structure exists for a node group 132 authorization. The SCM authorization model may be deployed by using node group 132 authorizations more often than node 130 authorizations. This model makes adding new nodes simpler because by adding a node 130 to an existing group 132, any authorizations associated with the group 132 may be inherited at run-time by the node 130.

The authorization model for determining if a user may execute a tool 240 on a set of nodes 130 may be defined by an "all or none" model. Therefore, the user 210 must have a valid authentication association for each target node 130 to execute the tool 240. If authorization does not exist for even one of the nodes 130, the tool execution fails.

The SCM module 110 may also include security features to secure transactions that transmit across the network. All network transactions may be digitally signed using a public or private key pair. The recipient of network transmissions may be assured of who the transmission came from and that the data was not altered in the transmission. A hostile party on the network may be able view the transactions, but may not counterfeit or alter them.

Figure 3:
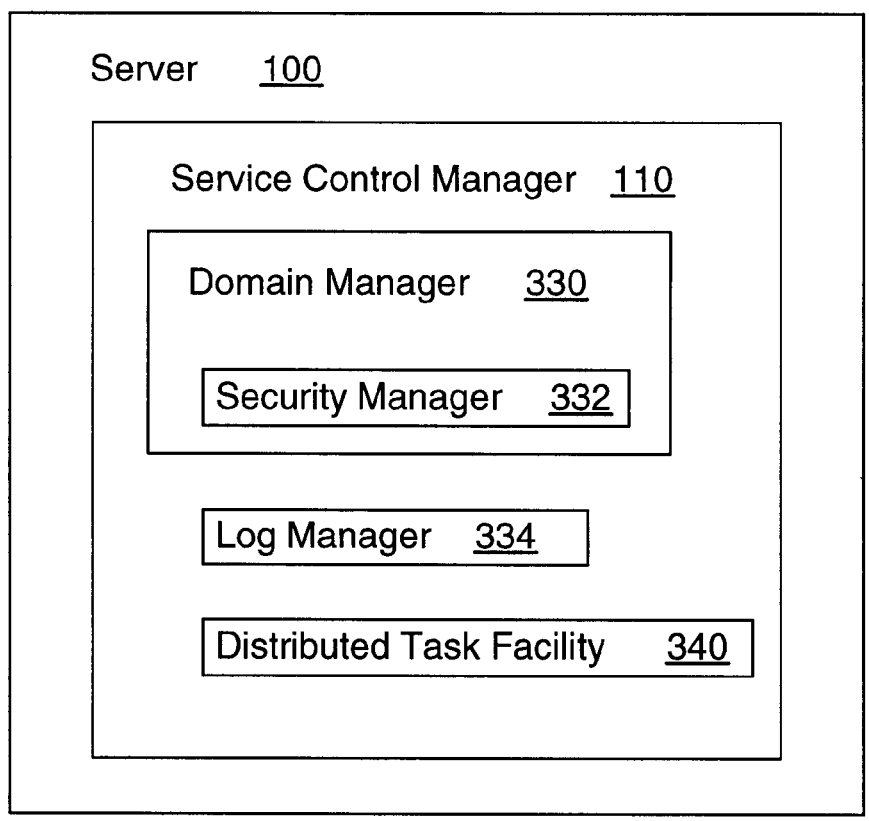
FIG. 3 is a flow chart of a light weight method for authorizing non-root users to run root

Referring to FIG. 3, the CMS 100 may include a domain manager 330, a log manager 334, and a distributed task facility (DTF) 240. The domain manager 330 is the "brain" of SCM module 110 and may be connected to the repository 104 for storage of the definitions of all the objects.

The DTF 340 may execute tasks by passing the task definitions and information to agents running on the managed nodes 130. The DTF 340 is the "heart" of all task execution activity in that all of the execution steps must go through the DTF 340.

An integral part of the SCM functionality may be the ability to record and maintain a history of events, by logging both SCM configuration changes and task execution events through the log manager 334. The log manager 334 may manage a log file and take log requests from the DTF 340 and write the requests to the SCM log file. SCM configuration changes may include adding, modifying and deleting users and nodes in the SCM module 110, and creating, modifying and deleting node groups 132 and tools 240. Task execution events may include details and intermediate events associated with the running of a tool 240. The details that are logged may include the identity of the user 210 who launched the task, the actual tool and command line with arguments, and the list of target nodes 130. The intermediate events that are logged may include the beginning of a task on a managed node 130, and exceptions that occur in attempting to run a tool 240 on a node 130, and the final result, if any, of the task.

A security manager 332, which is a subsection of the domain manager 330, typically guard the system security by checking whether the user 210 is authorized to run the tool 240 on all of the nodes 130 requested, i.e., whether the user 210 is assigned the roles 220 associated with the tool 240 on all of the nodes 130.

The trusted user typically defines tools 240 and authorizes other users 210 to use the tools 240. An example of tool definition is described in United States patent application of Lister, Sanchez, Drees, and Finz, application Ser. No. 09/800,316, entitled "Service Control Manager Tool Definition", and filed on Mar. 6, 2001, which is incorporated herein by reference. The tools 240 may specify commands that the user 210 intends to run, such as commands to install software or to lookup a file in a directory. Parameters to the tools 240 may include required parameters and optional parameters, such as an option to list the time that a file is created.

The commands that modify a system's configuration, root commands, typically may only be run by root users 210. If non-root users 210 wish to run these commands as root users, the non-root users 210 may need to be authorized first, typically by a trusted user or a senior administrator, through a time-consuming authorization process.

The SCM module 110 may, through a light weight centralized authorization process, grant limited access to a non-root user 210 to run certain root commands without external authorization involving the trusted user or the senior administrator. The SCM module 110 may utilize the authorization model described above to assign the tools 240 that specify the root commands to a specific role 220 and assign the role 220 to the non-root user 210, so that the non-root user 210 may, based upon the roles 220 assigned, run the root commands and options specified in these tools as a root user 210, i.e., without external authorization. However, the non-root user 210 has only limited access in that he/she is only authorized to run the commands assigned to the specific role 220. The usage of the commands specified in the tools may be tracked and logged, typically by the log manager 334 who observes each of the commands that are run within the role 220. If the non-root user 210 tries to run a command that is not assigned to the role 220, the log manager 334 may block that attempt. Therefore, the light weight authorization may be achieved without compromising system security. The user 210 may also be given a finer granularity of running specific commands with specific options. If the non-root user 210 attempts to run a command with additional or different options than the ones specified in the tool definition, the log manager 334 may block that attempt. In addition, assigned with the specific role 220, the non-root user 210 may only need to be authorized on one node (machine) 130 to be able to perform the commands on multiple nodes 130.

Figure 4:
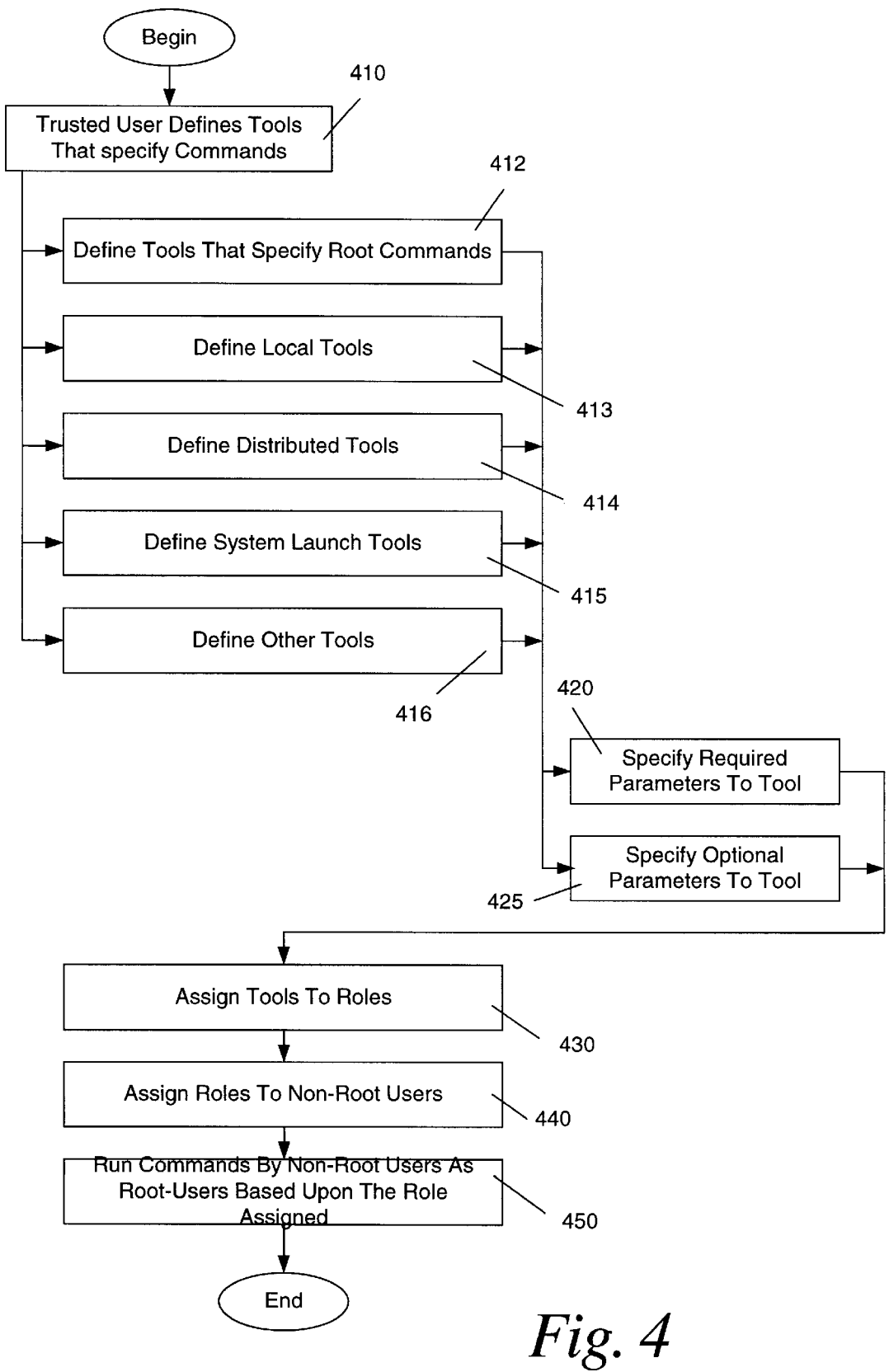
FIG. 4 is a flow chart of a light weight method for authorizing non-root users 210 to run root commands.
Figure 5:
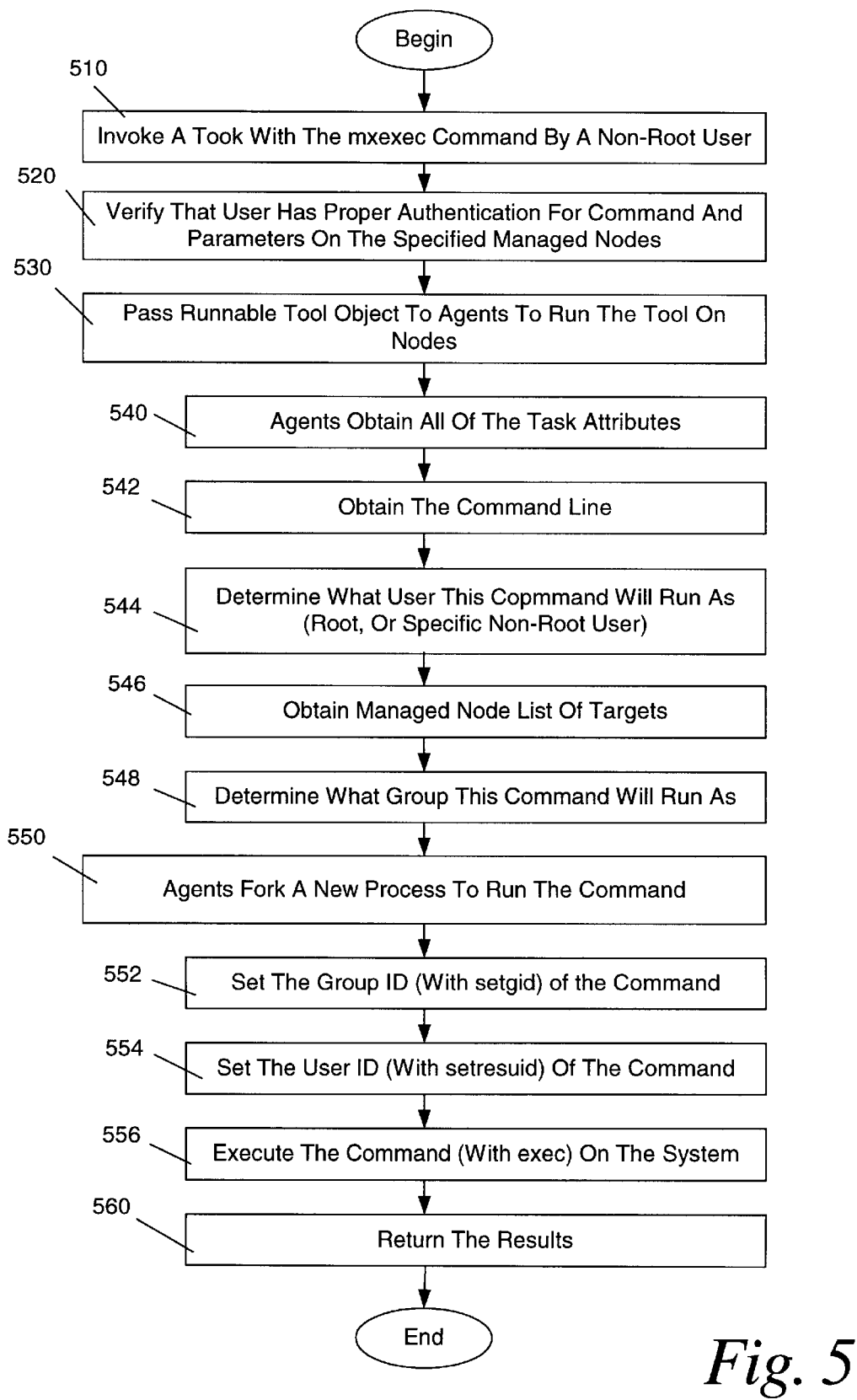
FIG. 5 is a flow chart of a method for running a tool 240 by a non-root user 210 on a managed node 130.

FIG. 4 is a flow chart of a light weight method for authorizing non-root users 210 to run root commands, and FIG. 5 is a flow chart of a method for running a tool 240 by a non-root user 210 on a managed node 130. These methods may be implemented, for example, in software modules for execution by processor 108.

Referring to FIG. 4, the tools 240 may be defined, typically by the trusted user, to specify commands that can be run on the nodes 130 or node groups 132 associated with the SCM module 110, step 410. The tools 240 may include tools that specify root commands, step 412, SSA tools, step 413, and MSA tools, step 414. The trusted user may then specify required and optional parameters to the tools 240, steps 420 and 425, and assign the tools 240 to different roles 220 via the authorization model associated with the SCM module 110, step 430. Specific roles 220 may be assigned to non-root users 210 via the authorization model, step 440, so that the non-root users 210 with the specific roles 220 may run the root commands assigned to the specific roles 220 on one or all of the nodes 130 or node groups 132 without external authorization, step 450. Since the non-root users 210 may only be authorized to run the commands assigned to the specific roles 220, system security may still be maintained in this light weight authorization process. In addition, the non-root users 210 with the roles 220 may only need to be authorized on one node 130 associated with the SCM module 110 to be able to perform the same commands on multiple nodes 130.

FIG. 5 illustrates a method for executing a tool 240 by a non-root user 210 on a managed node 130. An example of tool execution is described in United States patent application of Lister, Sanchez, Drees, and Finz, application Ser. No. 09/8 13,562, entitled "Service Control Manager Tool Execution", and filed on Mar. 20, 2001, which is incorporated herein by reference. A tool 240 may be invoked by a non-root user 210 using a command, such as mxexec, via command line interface (CLI), step 510. The security manager 332 110 may verify whether the user 210 has proper authentication for commands and parameters associated with the tool 240 on the specified managed nodes 130, step 520. Then the DTF 340 may pass a runnable tool object to the agents associated with the individual nodes 130 to run the tool 240 on the nodes 130, step 530. On the individual managed nodes 130, the agents may first obtain all task attributes, step 540, including, obtaining the command line, step 542, determining whether the user 210 will run as a root user or a specific non-root user, step 544, obtaining managed node list of targets 130, step 546, and determining what group this command will run as, step 548. The agents may then fork a new process to run the command, step 550, by setting the group identification (ID) (with setgid) of the command, step 552, setting the user ID (with setresuid) of the command, step 554, and executing the command (with exec) on the managed nodes 130, step 556. The agents finally may return the results to the CMS 100, step 560.

While the present invention has been described in connection with an exemplary embodiment, it will be understood that many modifications will be readily apparent to those skilled in the art, and this application is intended to cover any variations thereof.

What is claimed is:

1. A method for authorizing non-root users to run root commands in a service control manager (SCM) module, comprising:

defining tools, wherein the tools specify commands or options that can be run on nodes associated with the SCM module;

assigning the tools to roles via an authorization model associated with the SCM module;

assigning the roles to non-root users via the authorization model; and running the commands or the options specified in the tools by the non-root users, based upon the roles assigned, on one or more of the nodes without external authorization.

2. The method of claim 1, wherein the defining step includes specifying root commands or options.

3. The method of claim 1, wherein the defining step includes defining single-system aware (SSA) tools.

4. The method of claim 1, wherein the defining step includes defining multi-system aware (MSA) tools.

5. The method of claim 1, wherein the defining step includes defining tools that launch system interactive applications.

6. The method of claim 1, further comprising logging tool execution events in an SCM central log file by a log manager.

7. The method of claim 1, wherein the assigning the roles step includes assigning the roles to non-root users via the authorization model, wherein the authorization model links the users to the roles and to the nodes.

8. A computer system comprising:

a central management server (CMS);

nodes that are managed servers linked to the CMS;

a SCM module, that runs on the central management server (CMS), the SCM comprising:

tools that run commands or options on the nodes;

roles that are assigned to users and that define which tool users can run; and an authorization model that authorizes the users to run the tools on the nodes based on the roles assigned to the users, wherein the authorization model assigns the roles to non-root users so that the non-root users can run the commands or the options as root users on the nodes.

9. The computer system of claim 8, wherein the commands or the options are root commands or root options.

10. The computer system of claim 8, wherein the tools are single-system aware (SSA) tools.

11. The computer system of claim 8, wherein the tools are multi-system aware (MSA) tools.

12. The computer system of claim 8, wherein the tools are tools that launch system interactive applications.

13. The computer system of claim 8, wherein the nodes can be node groups.

14. The computer system of claim 8, wherein the authorization model links the users to the roles and to the nodes.

15. A method for authorizing non-root users to run root commands in a service control manager (SCM) module, comprising:

defining tools, wherein the tools specify root commands that can be run on nodes associated with the SCM module;

assigning the tools to roles via an authorization model associated with the SCM module;

assigning the roles to non-root users via the authorization model; and running the root commands specified in the tools by the non-root users, based upon the roles assigned, on one or more of the nodes without external authorization.

16. The method of claim 15, wherein the defining step includes defining single-system aware (SSA) tools.

17. The method of claim 15, wherein the defining step includes defining multi-system aware (MSA) tools.

18. The method of claim 15, wherein the defining step includes defining tools that launch system interactive applications.

19. The method of claim 15, further comprising logging tool execution events in an SCM central log file by a log manager.

20. The method of claim 15, wherein the assigning the roles step includes assigning the roles to non-root users via the authorization model, wherein the authorization model links the users to the roles and to the nodes.

* * * * *